US012691940B2

(12) United States Patent
Heo et al.

(10) Patent No.: US 12,691,940 B2
(45) Date of Patent: Jul. 28, 2026

(54) POSITION SENSOR AND STEERING APPARATUS

(71) Applicant: HL KLEMOVE CORP., Incheon (KR)

(72) Inventors: Hwan Heo, Incheon (KR); Minyoung Lee, Incheon (KR); Ilki Mun, Gyeonggi-do (KR); Jinseok Bae, Incheon (KR); Jungwook Seo, Incheon (KR)

(73) Assignee: HL KLEMOVE CORP., Incheon (KR)

( * ) Notice: Subject to any disclaimer, the term of this patent is extended or adjusted under 35 U.S.C. 154(b) by 446 days.

(21) Appl. No.: 18/219,481

(22) Filed: Jul. 7, 2023

(65) Prior Publication Data

US 2024/0010276 A1       Jan. 11, 2024

(30) Foreign Application Priority Data

Jul. 7, 2022   (KR) ........................ 10-2022-0083605
Dec. 19, 2022   (KR) ........................ 10-2022-0178593

(51) Int. Cl.
B62D 15/02        (2006.01)
B62D 5/00        (2006.01)
(Continued)

(52) U.S. Cl.
CPC ......... B62D 15/0215 (2013.01); B62D 5/001 (2013.01); B62D 5/0427 (2013.01);
(Continued)

(58) Field of Classification Search
CPC .. B62D 15/0215; B62D 5/001; B62D 5/0427; B62D 5/046; B62D 15/0225; G01B 7/30; G01D 5/20; G01D 5/2006; G01D 2205/28
See application file for complete search history.

(56) References Cited

U.S. PATENT DOCUMENTS

2010/0102803 A1* 4/2010 Kobayashi .......... G01D 5/2013
                                                324/207.25
2010/0231206 A1   9/2010 Kobayashi
                (Continued)

FOREIGN PATENT DOCUMENTS

CN        107356193 A      11/2017
DE          19506938 A1 *  8/1996   ............. G01K 13/02
                (Continued)

OTHER PUBLICATIONS

Office Action dated Mar. 7, 2024 for German Patent Application No. 102023117998.5 and its English translation provided by Google.
(Continued)

*Primary Examiner* — Drew J Brown
(74) *Attorney, Agent, or Firm* — WOMBLE BOND DICKINSON (US) LLP

(57)        ABSTRACT

A position sensor includes a substrate having a first surface and a second surface opposite to the first surface; an initial shaft passing through the first and the second surfaces of the substrate in a direction perpendicular to the substrate; an initial gear mounted to the initial shaft and positioned above the first surface of the substrate; a first sub-shaft positioned above the first surface of the substrate, and disposed perpendicular to the substrate and parallel to the initial shaft; a first sub-gear mounted to the first sub-shaft and positioned above the first surface of the substrate and rotatably engaged with the initial gear; a first sub-rotor mounted to the first sub-shaft and positioned above the first surface of the substrate; a first sensing coil disposed on the first surface of the substrate; a second sub-shaft positioned above the first surface of the substrate, and disposed perpendicular to the substrate and parallel to the initial shaft and the first sub-shaft; a second sub-gear mounted to the second sub-shaft and positioned above the first surface of the substrate and rotatably engaged with the initial gear; a second sub-rotor (Continued)

mounted to the second sub-shaft and positioned above the first surface of the substrate; and a second sensing coil disposed on the first surface of the substrate.

20 Claims, 7 Drawing Sheets

(51) Int. Cl.
     *B62D 5/04*         (2006.01)
     *G01B 7/30*         (2006.01)
     *G01D 5/20*         (2006.01)
(52) U.S. Cl.
     CPC .............. *B62D 5/046* (2013.01); *G01B 7/30* (2013.01); *G01D 5/20* (2013.01)

(56)          References Cited

U.S. PATENT DOCUMENTS

| | | | | |
|---|---|---|---|---|
| 2011/0080162 | A1* | 4/2011 | Steinich | .................. G01B 7/30 |
| | | | | 324/207.25 |
| 2015/0323349 | A1* | 11/2015 | Has | ......................... G01P 3/488 |
| | | | | 324/207.25 |
| 2016/0341574 | A1* | 11/2016 | Hayashi | ................. G01D 5/204 |
| 2017/0160101 | A1* | 6/2017 | Frese | ..................... G01D 5/147 |
| 2018/0372513 | A1* | 12/2018 | Cai | ......................... G01L 3/109 |
| 2019/0002015 | A1* | 1/2019 | Hwang | ............... B62D 5/0463 |
| 2020/0198689 | A1* | 6/2020 | Ashida | .................. B62D 5/001 |

FOREIGN PATENT DOCUMENTS

| | | | | |
|---|---|---|---|---|
| DE | 102009031012 A1 | 4/2010 | | |
| DE | 102010002794 A1 | 11/2010 | | |
| DE | 102009048389 A1 | 5/2011 | | |
| DE | 102013010415 A1 | 1/2014 | | |
| DE | 102014208642 A1 | 11/2015 | | |
| DE | 102015202732 A1 | 8/2016 | | |
| DE | 102016109206 A1 | 11/2016 | | |
| DE | 102020123055 A1 | 3/2021 | | |
| DE | 102020108981 A1 | 10/2021 | | |
| EP | 1 477 389 | 11/2004 | | |
| EP | 2180296 A1 * | 4/2010 | .............. | G01D 5/20 |
| KR | 10-2017-0043169 | 4/2017 | | |
| KR | 10-2019-0001964 | 1/2019 | | |
| KR | 20240007053 A * | 1/2024 | ............ | G01D 5/202 |
| WO | 2020/260677 | 12/2020 | | |

OTHER PUBLICATIONS

Office Action (1st) dated Mar. 1, 2026 for Chinese Patent Application No. 202310829793.7 and its English translation provided by Applicant's foreign counsel. 10-2022-0178593.
Office Action (1st) dated Mar. 18, 2026 for Korean Patent Application No. translation provided by Applicant's foreign counsel.

\* cited by examiner

POSITION SENSOR AND STEERING APPARATUS

CROSS-REFERENCE TO RELATED APPLICATION

This application claims the benefit of Korean Patent Application No. 10-2022-0083605, filed on Jul. 7, 2022, and No. 10-2022-0178593, filed on Dec. 19, 2022, in the Korean Intellectual Property Office, the disclosures of which are incorporated herein by reference in its entirety.

BACKGROUND

1. Technical Field

Some embodiments of the present disclosure generally relate to a position sensor and a steering apparatus capable of detecting a position and/or movement of a rack bar of a vehicle.

2. Description of the Related Art

In general, a steering apparatus for controlling a traveling direction of a vehicle may include a steering wheel disposed at a driver's seat, a steering column connected to the steering wheel, a rack gear/pinion gear that converts rotational motion provided from the steering column into linear motion, a rack bar connected to the rack gear, and the like.

In addition, the steering apparatus may include an angle sensor that measures a rotation angle of the steering column that rotates as a driver rotates the steering wheel, and a torque sensor that measures torque applied to the steering wheel by the driver to rotate the steering wheel. An electronic control unit (ECU) of the steering apparatus may determine a steering angle of the vehicle based on outputs of the angle sensor and the torque sensor.

In recent years, research on omitting a mechanical connection between the steering wheel and the rack bar in the steering apparatus has been conducted. A so-called steering-by-wire steering apparatus may detect the rotation of the steering wheel using the angle sensor and the torque sensor and linearly move the rack bar using a motor.

As such, since the mechanical connection between the steering wheel and the rack bar can be removed in the steer-by-wire steering apparatus, an additional sensor for detecting the linear motion of the rack bar may be required.

SUMMARY

Therefore, it is an aspect of the present disclosure to provide a position sensor and a steering apparatus capable of detecting a position and movement of a rack bar of a vehicle.

It is another aspect of the present disclosure to provide a position sensor and a steering apparatus capable of improving reliability, stability, and robustness of position detection and movement detection of a rack bar of a vehicle.

Additional aspects of the disclosure will be set forth in part in the description which follows and, in part, will be obvious from the description, or may be learned by practice of the disclosure.

In accordance with one aspect of the present disclosure, a position sensor includes a substrate including a first surface and a second surface; an initial shaft extending from a first side corresponding to the first surface of the substrate to a second side corresponding to the second surface of the substrate, to be perpendicular to the substrate; an initial gear provided on the first side of the substrate and configured to rotate about the initial shaft; a first sub-shaft provided on the first side of the substrate, and extending perpendicular to the substrate and parallel to the initial shaft; a first sub-gear provided on the first side of the substrate, configured to rotate about the first sub-shaft, and engaged with the initial gear; a first sub-rotor provided on the first side of the substrate, and configured to rotate about the first sub-shaft; a first sensing coil provided on the first surface of the substrate; a second sub-shaft provided on the first side of the substrate, and extending perpendicular to the substrate and parallel to the initial shaft and the first sub-shaft; a second sub-gear provided on the first side of the substrate, configured to rotate about the second sub-shaft, and engaged with the initial gear; a second sub-rotor provided on the first side of the substrate and configured to rotate about the second sub-shaft; and a second sensing coil provided on the first surface of the substrate.

A first gear ratio between the initial gear and the first sub-gear may be different from a second gear ratio between the initial gear and the second sub-gear.

A rotational speed of the first sub-gear may be different from a rotational speed of the second sub-gear.

A diameter of the first sub-gear may be different from a diameter of the second sub-gear.

A diameter of the initial gear may be greater than a diameter of the first sub-gear and a diameter of the second sub-gear.

The first sub-gear and the first sub-rotor may rotate about a rotation axis of the first sub-shaft. The second sub-gear and the second sub-rotor may rotate about a rotation axis of the second sub-shaft.

An imaginary straight line extending from a rotation axis of the first sub-rotor may pass through a center of the first sensing coil. An imaginary straight line extending from a rotation axis of the second sub-rotor may pass through a center of the second sensing coil.

The first sub-rotor may include a plurality of first rotor teeth provided on a circumference of the first sub-rotor. The second sub-rotor may include a plurality of second rotor teeth provided on a circumference of the second sub-rotor.

The first sensing coil may be disposed in a zigzag manner between an imaginary first circle having a first radius and an imaginary second circle having a second radius greater than the first radius. The second sensing coil may be disposed in a zigzag manner between an imaginary third circle having a third radius and an imaginary fourth circle having a fourth radius greater than the third radius.

A radial width of each of the plurality of first rotor teeth may be equal to a difference between the second radius and the first radius. A radial width of each of the plurality of second rotor teeth may be equal to a difference between the fourth radius and the third radius.

A circumferential width of each of the plurality of first rotor teeth may be equal to a distance to an adjacent first rotor tooth. A circumferential width of each of the plurality of second rotor teeth may be equal to a distance to an adjacent second rotor tooth.

The position sensor may further include a processor electrically connected to the first sensing coil and the second sensing coil.

The processor may be configured to identify impedance or reluctance of the first sensing coil, identify a rotation angle of the first sub-rotor based on identifying the impedance or reluctance of the first sensing coil, identify impedance or reluctance of the second sensing coil, and identify a rotation angle of the second sub-rotor based on identifying the impedance or reluctance of the second sensing coil.

The processor may be configured to identify a rotation angle of the initial shaft based on the rotation angle of the first sub-rotor and the rotation angle of the second sub-rotor.

The initial shaft may be connected to a rack bar assembly of a vehicle.

In accordance with another aspect of the present disclosure, a steering apparatus includes a rack bar assembly connected to wheels of a vehicle, a steering motor configured to provide rotation for linearly moving the rack bar assembly, an angle sensor configured to identify a rotation angle of a steering column connected to a steering wheel of the vehicle, an initial shaft connected to the rack bar assembly, a position sensor configured to measure a rotation angle of the initial shaft, and a controller configured to control the steering motor based on an output signal of the angle sensor and an output signal of the position sensor. The position sensor may include a substrate including a first surface and a second surface, the initial shaft provided on the first side corresponding to the first surface of the substrate and extending perpendicular to the substrate; an initial gear provided on a first side of the substrate and configured to rotate about the initial shaft; a first sub-shaft provided on the first side of the substrate, and extending perpendicular to the substrate and parallel to the initial shaft; a first sub-gear provided on the first side of the substrate, configured to rotate about the first sub-shaft, and engaged with the initial gear; a first sub-rotor provided on the first side of the substrate, and configured to rotate about the first sub-shaft; a first sensing coil provided on the first surface of the substrate; a second sub-shaft provided on the first side of the substrate, and extending perpendicular to the substrate and parallel to the initial shaft and the first sub-shaft; a second sub-gear provided on the first side of the substrate, configured to rotate about the second sub-shaft, and engaged with the initial gear; a second sub-rotor provided on the first side of the substrate and configured to rotate about the second sub-shaft; and a second sensing coil provided on the first surface of the substrate.

A first gear ratio between the initial gear and the first sub-gear may be different from a second gear ratio between the initial gear and the second sub-gear.

A diameter of the first sub-gear may be different from a diameter of the second sub-gear.

The position sensor may further include a processor electrically connected to the first sensing coil and the second sensing coil. The processor may be configured to identify impedance or reluctance of the first sensing coil, identify a rotation angle of the first sub-rotor based on identifying the impedance or reluctance of the first sensing coil, identify impedance or reluctance of the second sensing coil, and identify a rotation angle of the second sub-rotor based on identifying the impedance or reluctance of the second sensing coil.

The processor may be configured to identify the rotation angle of the initial shaft based on the rotation angle of the first sub-rotor and the rotation angle of the second sub-rotor and provide an output signal corresponding to the rotation angle of the initial shaft to the controller.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
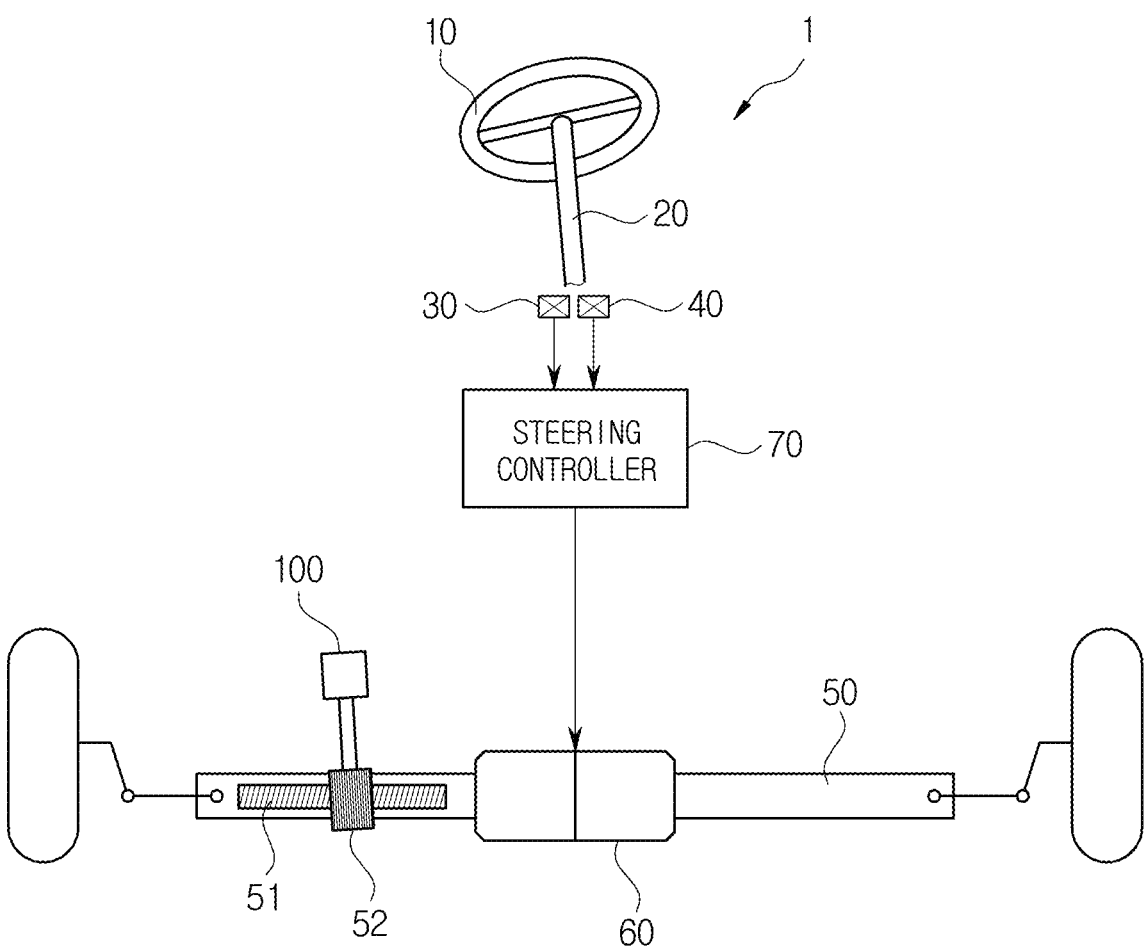
FIG. 1 illustrates a conceptual diagram of a steering apparatus including a position sensor in accordance with an embodiment of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

FIG. 1 illustrates a conceptual diagram of a steering apparatus including a position sensor in accordance with an embodiment of the present disclosure.

As illustrated in FIG. 1, a steering apparatus 1 may include a steering wheel 10, a steering column 20, an angle sensor 30, a torque sensor 40, a rack bar assembly 50, a steering motor 60, a position sensor 100, or a steering controller 70. The components illustrated in FIG. 1 do not correspond to essential components of the steering apparatus 1, and at least some of the components illustrated in FIG. 1 may be omitted.

The steering wheel 10 may obtain an input related to a traveling direction of a vehicle or a driver's steering intention (hereinafter, referred to as a "steering input") from the driver. The steering wheel 10 may rotate clockwise or counterclockwise according to the driver's steering input.

The steering column 20 may support the steering wheel 10 and function as a rotation axis of the steering wheel 10. The steering column 20 may rotate with the rotation of the steering wheel 10.

The angle sensor 30 may detect rotation of the steering wheel 10 or the steering column 20 by the driver and measure a rotation angle of the steering wheel 10 or the steering column 20. The angle sensor 30 may provide an electrical signal corresponding to the measured rotation angle to the steering controller 70.

The torque sensor 40 may detect rotation of the steering wheel 10 or the steering column 20 and measure torque applied to the steering wheel 10 or the steering column 20 by the driver. The torque sensor 40 may provide an electrical signal corresponding to the measured torque to the steering controller 70.

The rack bar assembly 50 may be connected to wheels of the vehicle and move linearly by driving the steering motor 60. The rack bar assembly 50 may change a rotation axis direction of a vehicle wheel to change the traveling direction of the vehicle. For example, the rack bar assembly 50 may move linearly to rotate the rotation axis of the wheel counterclockwise. Thereby, the vehicle may turn left. In addition, the rack bar assembly 50 may move linearly to rotate the rotation axis of the wheel clockwise. Thereby, the vehicle may turn right.

The steering motor 60 may be connected to the rack bar assembly 50 through a power conversion device and provide rotational force for linearly moving the rack bar assembly 50. The steering motor 60 may provide rotational force for linearly moving the rack bar assembly 50 to the left or right in response to control of the steering controller 70. For example, rotation of the steering motor 60 may be converted into linear motion through a rack gear and a pinion gear.

The position sensor 100 may detect the linear motion of the rack bar assembly 50 and measure displacement of the rack bar assembly 50. For example, the linear motion of the rack bar assembly 50 may be converted into rotational motion through a rack gear 51 and a pinion gear 52, and the position sensor 100 may measure the displacement for the rotational motion by the conversion. The position sensor 100 may provide an electrical signal corresponding to the measured displacement of the rack bar assembly 50 to the steering controller 70.

The steering controller 70 may obtain detection signals output from the angle sensor 30, the torque sensor 40, and/or the position sensor 100, and control the steering motor 60 based on the obtained detection signals.

For example, the steering controller 70 may identify the driver's steering input and/or steering intention based on output signals of the angle sensor 30 and/or the torque sensor 40. The steering controller 70 may control the steering motor 60 to move the rack bar assembly 50 to a target position based on the identified steering input and/or steering intention.

The steering controller 70 may identify an actually measured position of the rack bar assembly 50 based on the output signal of the position sensor 100. In addition, the steering controller 70 may compare the actually measured position with the target position and control the steering motor 60 so that the actually measured position of the rack bar assembly 50 follows the target position.

In this way, the angle sensor 30 may detect the driver's steering input. Further, the position sensor 100 may detect the displacement of the rack bar assembly 50.

The angle sensor 30 and the position sensor 100 may perform the same or at least a similar function of identifying the rotation angle of the shaft. Further, the angle sensor 30 and the position sensor 100 may have the same or at least a similar structure.

Hereinafter, a detailed structure and operation of the position sensor 100 will be described, and a specific structure and operation of the angle sensor 30 may be substantially the same as those described below.

Figure 2:
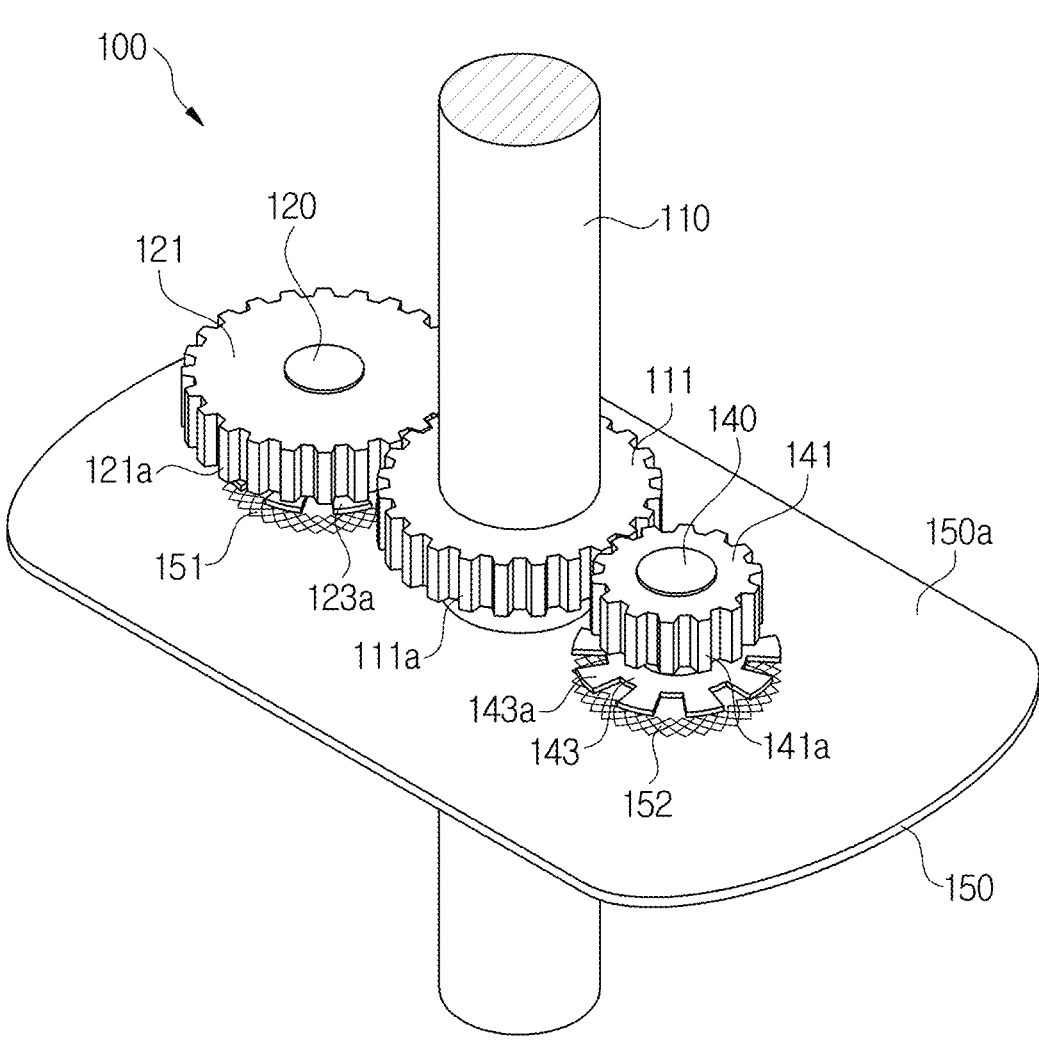
FIG. 2 is an upper perspective view of a position sensor in accordance with an embodiment of the present disclosure.
Figure 3:
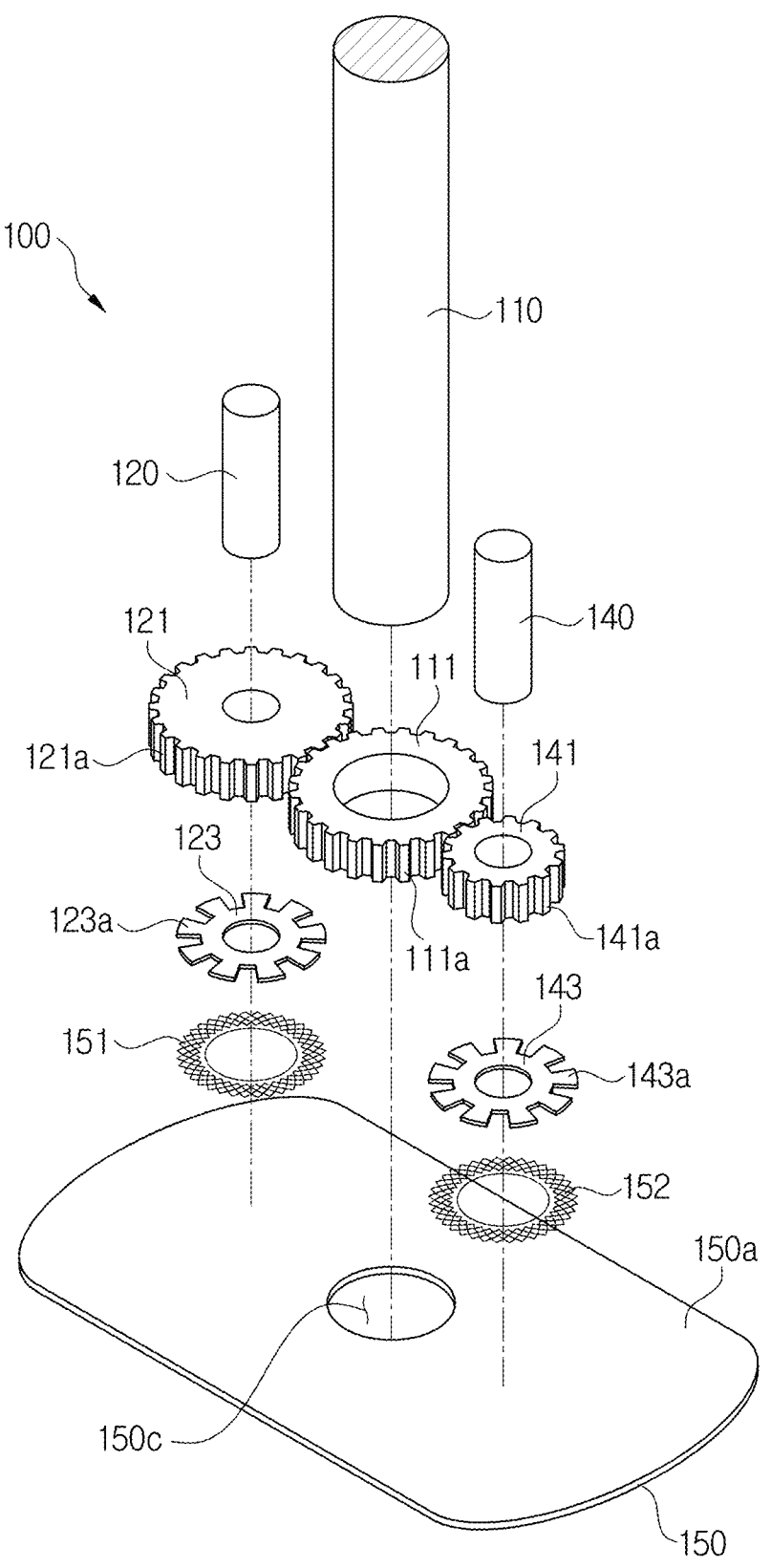
FIG. 3 is an exploded view of a position sensor in accordance with an embodiment of the present disclosure.
Figure 4:
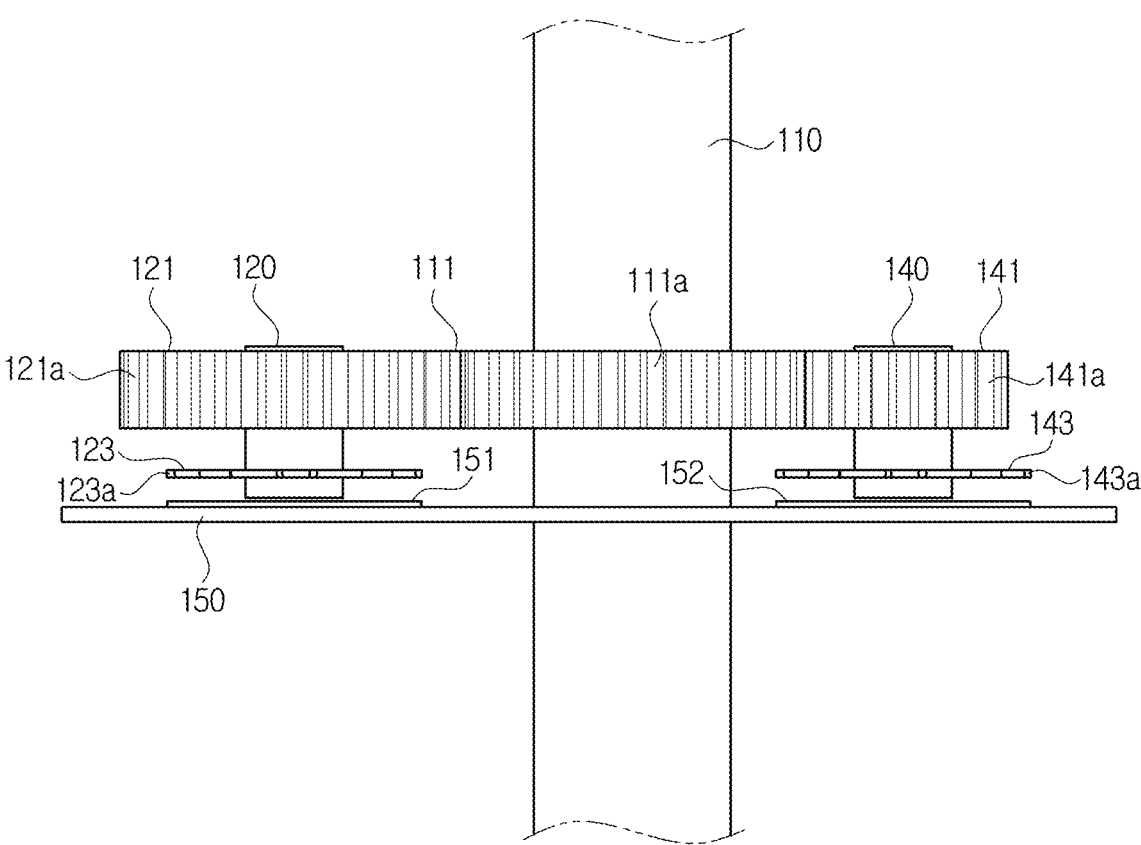
FIG. 4 is a side view of a position sensor in accordance with an embodiment of the present disclosure.
Figure 5:
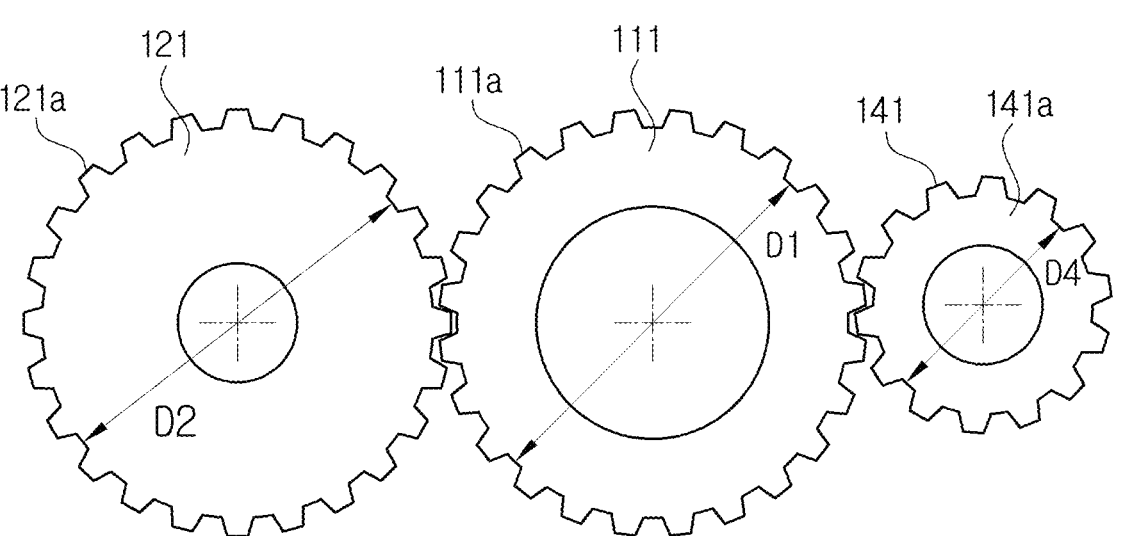
FIG. 5 illustrates an initial gear, a first sub-gear, and a second sub-gear included in a position sensor in accordance with an embodiment of the present disclosure.
Figure 6:
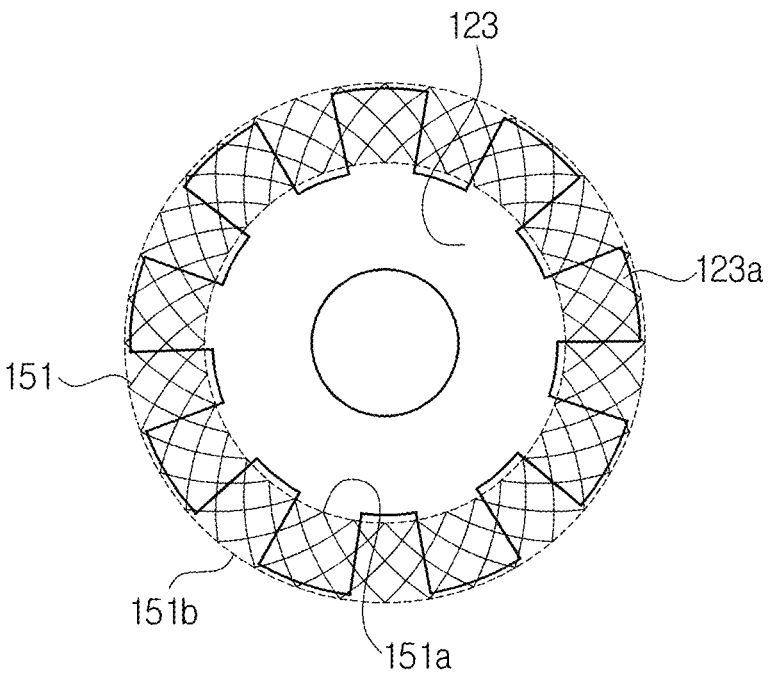
FIG. 6 illustrates a first rotor and a first sensing coil included in a position sensor in accordance with an embodiment of the present disclosure.

FIG. 2 is an upper perspective view of a position sensor in accordance with an embodiment of the present disclosure. FIG. 3 is an exploded view of a position sensor in accordance with an embodiment of the present disclosure. FIG. 4 is a side view of a position sensor in accordance with an embodiment of the present disclosure. FIG. 5 illustrates an initial gear, a first sub-gear, and a second sub-gear included in a position sensor in accordance with an embodiment of the present disclosure. FIG. 6 illustrates a first rotor and a first sensing coil included in a position sensor in accordance with an embodiment of the present disclosure.

As illustrated in FIGS. 2, 3, 4, 5, and 6, the position sensor 100 may include an initial shaft 110, an initial gear 111, a first sub-shaft 120, a first sub-gear 121, a first sub-rotor 123, a first sensing coil 151, a second sub-shaft 140, a second sub-gear 141, a second sub-rotor 143, a second sensing coil 152, or a substrate 150. Components illustrated in FIGS. 2 to 6 do not correspond to essential components of the position sensor 100, and at least some of the components illustrated in FIGS. 2 to 6 may be omitted.

The initial shaft 110 may be connected to the rack bar assembly 50 through a power conversion device. The power conversion device may convert the linear motion of the rack bar assembly 50 into the rotational motion of the initial shaft 110. For example, the power conversion device may include the rack gear and the pinion gear.

The initial shaft 110 may rotate with the linear motion of the rack bar assembly 50. For example, as the rack bar assembly 50 linearly moves in a first direction, the initial shaft 110 may rotate in a first rotational direction (clockwise). In addition, as the rack bar assembly 50 linearly moves in a second direction different from the first direction, the initial shaft 110 may rotate in a second rotational direction (counterclockwise) different from the first rotational direction.

Further, the initial shaft 110 may be provided substantially perpendicular to the substrate 150. Specifically, the initial shaft 110 may pass through the substrate 150 through a through-hole 150*c* formed in the substrate 150. The initial shaft 110 may extend from a first surface 150*a* of the substrate 150 to a second surface 150*b* of the substrate 150 through the through-hole 150*c*.

The initial gear 111 may be provided on the side of the first surface 150*a* of the substrate 150 in a substantially cylindrical shape.

The initial gear 111 may be provided on the initial shaft 110 to be rotatable together with the initial shaft 110. Specifically, the initial gear 111 may be provided on the same axis as the initial shaft 110. Thereby, the initial gear 111 may rotate at the same rotational speed in the same rotational direction as the initial shaft 110 about the same axis as the rotation axis of the initial shaft 110.

A plurality of initial teeth 111*a* may be formed on an outer circumferential surface of the initial gear 111. As the initial gear 111 rotates, the plurality of initial teeth 111*a* may rotate and move along the outer circumferential surface of the initial gear 111.

The first sub-gear 121 may be provided on the side of the first surface 150*a* of the substrate 150 in a substantially cylindrical shape.

The first sub-gear 121 may be provided on the first sub-shaft 120. Here, the first sub-shaft 120 may be provided substantially parallel to the initial shaft 110.

Specifically, the first sub-gear 121 may be provided on the same axis as the first sub-shaft 120 to be rotatable together with the first sub-shaft 120. Thereby, the first sub-gear 121 may rotate at the same rotational speed in the same rotational direction as the first sub-shaft 120 about the same axis as the rotation axis of the first sub-shaft 120.

A plurality of first sub-teeth 121*a* may be formed on an outer circumferential surface of the first sub-gear 121. The plurality of first sub-teeth 121*a* may be engaged with the plurality of initial teeth 111*a* of the initial gear 111. Specifically, the rotation of the initial gear 111 may be transmitted to the first sub-gear 121 through the plurality of initial teeth 111*a* and the plurality of first sub-teeth 121*a*.

A diameter of the first sub-gear 121 may be different from as a diameter of the initial gear 111. In addition, the number of the plurality of first sub-teeth 121*a* formed on the outer circumferential surface of the first sub-gear 121 may be different from the number of the plurality of initial teeth 111*a* formed on the outer circumferential surface of the initial gear 111.

As illustrated in FIG. 5, a diameter D1 of the initial gear 111 may be larger than a diameter D2 of the first sub-gear 121. In addition, the number of the plurality of initial teeth 111*a* may be larger than the number of the plurality of first sub-teeth 121*a*. For example, a ratio between the diameter D1 of the initial gear 111 and the diameter D2 of the first sub-gear 121 may be approximately 1.216:1. In addition, a ratio between the number of the plurality of initial teeth 111*a* and the number of the plurality of first sub-teeth 121*a* may be approximately 1.216:1.

The first sub-gear 121 may rotate in engagement with the initial gear 111, but the rotational speed of the first sub-gear 121 may be different from the rotational speed of the initial gear 111. The rotational speed of the first sub-gear 121 may be higher than the rotational speed of the initial gear 111.

The initial gear 111 and the first sub-gear 121 may rotate at a constant gear ratio. For example, a gear ratio between the initial gear 111 and the first sub-gear 121 may be approximately 1.216:1, and a rotation ratio between the initial gear 111 and the first sub-gear 121 may be approximately 1:1.216. In other words, while the initial gear 111 rotates once, the first sub-gear 121 may rotate approximately 1.216 times. In addition, while the initial gear 111 rotates approximately 296 degrees, the first sub-gear 121 may rotate approximately 360 degrees.

The first sub-rotor 123 may be provided between the substrate 150 and the first sub-gear 121 on the side of the first surface 150*a* of the substrate 150 in a substantially disc shape. In other words, the substrate 150, the first sub-rotor 123, and the first sub-gear 121 may be stacked on the first surface 150*a* of the substrate 150 in that order.

The first sub-rotor 123 may be provided on the first sub-shaft 120 in a substantially disc shape. The first sub-rotor 123 may be provided on the same axis as the first sub-shaft 120 to be rotatable together with the first sub-shaft 120. Thereby, the first sub-rotor 123 may rotate at the same rotational speed in the same rotational direction as the first sub-shaft 120 about the same axis as the rotation axis of the first sub-shaft 120. In addition, the first sub-rotor 123 may rotate at the same rotational speed in the same rotational direction as the first sub-gear 121 about the same axis as the rotation axis of the first sub-gear 121.

As illustrated in FIG. 6, a plurality of first rotor teeth 123*a* may be formed on an outer circumference of the first sub-rotor 123. Cavities may be formed between the plurality of first rotor teeth 123*a*.

Shapes of the plurality of first rotor teeth 123*a* may be substantially the same. In addition, shapes of the cavities between the plurality of first rotor teeth 123*a* may also be substantially the same. Widths and distances of the plurality of first rotor teeth 123*a* in a circumferential direction may be substantially constant. In other words, the circumferential width of each of the plurality of first rotor teeth 123*a* may be substantially the same as the circumferential distance between two adjacent first rotor teeth 123*a*.

For example, the first rotor teeth 123*a* may be periodically formed along the outer circumference of the first sub-rotor 123. In addition, while the first rotor teeth 123*a* revolve, the first rotor teeth 123*a* may periodically pass near a specific position of the substrate 150.

A diameter of the first sub-rotor 123 is not limited. For example, the diameter of the first sub-rotor 123 may be greater than, equal to, or smaller than the diameter of the first sub-gear 121.

The first sensing coil 151 may be provided on the first surface 150*a* of the substrate 150 in a substantially disc shape. The first sensing coil 151 is fixed on the first surface 150*a* of the substrate 150 and does not rotate together with the first sub-shaft 120.

The first sensing coil 151 may be disposed in a zigzag manner between circumferences of imaginary circles having different radii. For example, as illustrated in FIG. 6, the first sensing coil 151 may be disposed in a zigzag manner between an imaginary first circle 151*a* having a first radius and an imaginary second circle 151*b* having a second radius larger than the first radius.

In other words, a distance between the center of the first sensing coil 151 and the first sensing coil 151 may periodically change. For example, the first sensing coil 151 may extend from a circumference of the first circle 151*a* to a circumference of the second circle 151*b*, and extend from the circumference of the second circle 151*b* to the circumference of the first circle 151*a*. Thus, it may be repeated that the first sensing coil 151 extends from the circumference of the first circle 151*a* to the circumference of the second circle 151*b*, and extends from the circumference of the second circle 151*b* to the circumference of the first circle 151*a*.

An area occupied by the first sensing coil 151 may be substantially the same as an area occupied by the plurality of first rotor teeth 123a of the first sub-rotor 123. In other words, the plurality of first rotor teeth 123a of the first sub-rotor 123 may be positioned to correspond to an annular area between the first circle 151a and the second circle 151b forming the first sensing coil 151. A radial width of each of the first rotor teeth 123a may be substantially the same as a radial width of the annular area between the first circle 151a and the second circle 151b.

The center of the annular first sensing coil 151 may be substantially the same as the center of rotation of the first sub-rotor 123. In other words, an imaginary first straight line extending from the rotation axis of the first sub-rotor 123 may pass through the center of the annular first sensing coil 151.

The first sub-rotor 123 may be provided in the vicinity of the first sensing coil 151. In other words, the first sub-rotor 123 may rotate about the center of the first sensing coil 151 in the vicinity of the first sensing coil 151.

Thereby, the plurality of first rotor teeth 123a may periodically pass near the first sensing coil 151 by the rotation of the first sub-rotor 123.

In this case, the first sub-rotor 123 and the plurality of first rotor teeth 123a may be made of a magnetic material, and as the plurality of first rotor teeth 123a, which are made of the magnetic material, periodically pass near the first sensing coil 151, the reluctance of the first sensing coil 151 may periodically change and the impedance of the first sensing coil 151 may also periodically change. For example, the impedance or reluctance of the first sensing coil 151 may change in a cycle in which the first sub-rotor 123 rotates once.

Therefore, the rotation of the first sub-rotor 123 may be identified by measuring the periodic change in impedance or reluctance of the first sensing coil 151.

The second sub-gear 141 may be provided on a side of the first surface 150a of the substrate 150. In other words, the second sub-gear 141 may be provided on the same side as the first sub-gear 121.

The second sub-gear 141 may be provided on the second sub-shaft 140 in a substantially cylindrical shape. Here, the second sub-shaft 140 may be provided substantially parallel to the initial shaft 110. The second sub-shaft 140 may be separated from the first sub-shaft 120.

Specifically, the second sub-gear 141 may be provided on the same axis as the second sub-shaft 140 to be rotatable together with the second sub-shaft 140. Thereby, the second sub-gear 141 may rotate at the same rotational speed in the same rotational direction as the second sub-shaft 140 about the same axis as the rotation axis of the second sub-shaft 140.

A plurality of second sub-teeth 141a may be formed on an outer circumferential surface of the second sub-gear 141. The plurality of second sub-teeth 141a may be engaged with the plurality of initial teeth 111a of the initial gear 111. Specifically, the rotation of the initial gear 111 may be transmitted to the second sub-gear 141 through the plurality of initial teeth 111a and the plurality of second sub-teeth 141a.

A diameter D4 of the second sub-gear 141 may be different from the diameter D1 of the initial gear 111. In addition, the number of the plurality of second sub-teeth 141a formed on the outer circumferential surface of the second sub-gear 141 may be different from the number of the plurality of initial teeth 111a formed on the outer circumferential surface of the initial gear 111.

As illustrated in FIG. 5, the diameter D1 of the initial gear 111 may be larger than the diameter D4 of the second sub-gear 141. In addition, the number of the plurality of initial teeth 111a may be larger than the number of the plurality of second sub-teeth 141a. For example, a ratio between the diameter D1 of the initial gear 111 and the diameter D4 of the second sub-gear 141 may be approximately 9:1. In addition, a ratio between the number of the plurality of initial teeth 111a and the number of the plurality of second sub-teeth 141a may be approximately 9:1.

The second sub-gear 141 may rotate in engagement with the initial gear 111, but the rotational speed of the second sub-gear 141 may be different from the rotational speed of the initial gear 111. The rotational speed of the second sub-gear 141 may be higher than the rotational speed of the initial gear 111. For example, a gear ratio between the initial gear 111 and the second sub-gear 141 may be approximately 9:1, and a rotation ratio between the initial gear 111 and the second sub-gear 141 may be approximately 1:9. In other words, while the initial gear 111 rotates once, the second sub-gear 141 may rotate approximately nine times. In addition, while the initial gear 111 rotates approximately 40 degrees, the second sub-gear 141 may rotate approximately 360 degrees.

As described above, the gear ratio between the initial gear 111 and the first sub-gear 121 may be approximately 1.216:1, and while the initial gear 111 rotates once, the first sub-gear 121 may rotate approximately 1.216 times.

Therefore, a rotation ratio of the first sub-gear 121 and the second sub-gear 141 may be approximately 1.216:9 (=1:7.4). Specifically, while the first sub-gear 121 rotates five times, the second sub-gear 141 may rotate 37 times.

In other words, while the first sub-gear 121 and the second sub-gear 141 rotate at the same time at a reference position and both the first sub-gear 121 and the second sub-gear 141 return to the reference position, the first sub-gear 121 may rotate five times and the second sub-gear 141 may rotate 37 times.

In addition, while the first sub-gear 121 rotates five times, the initial gear 111 may rotate 1480 degrees. In addition, while the second sub-gear 141 rotates 37 times, the initial gear 111 may rotate 1480 degrees. The rotation of the initial gear 111 may be the same as the rotation of the initial shaft 110. Thereby, while the first sub-gear 121 and the second sub-gear 141 rotate at the same time at the reference position and both the first sub-gear 121 and the second sub-gear 141 return to the reference position, the initial shaft 110 may rotate 1480 degrees.

Therefore, the rotation of the initial shaft 110 up to 1480 degrees may be identified by combination of the rotation angle of the first sub-gear 121 and the rotation angle of the second sub-gear 141.

The second sub-rotor 143 may be provided between the substrate 150 and the second sub-gear 141 on the side of the second surface 150b of the substrate 150 in a substantially disc shape. In other words, the substrate 150, the second sub-rotor 143, and the second sub-gear 141 may be stacked on the second surface 150b of the substrate 150 in that order.

The second sub-rotor 143 may be provided on the second sub-shaft 140 in a substantially disc shape. The second sub-rotor 143 may be provided on the same axis as the second sub-shaft 140 to be rotatable together with the second sub-shaft 140. Thereby, the second sub-rotor 143 may rotate at the same rotational speed in the same rotational direction as the second sub-shaft 140 about the same axis as the rotation axis of the second sub-shaft 140. In addition, the second sub-rotor 143 may rotate at the same rotational speed in the same rotational direction as the second sub-gear 141 about the same axis as the rotation axis of the second sub-gear 141.

A shape of the second sub-rotor 143 may be the same as a shape of the first sub-rotor 123 illustrated in FIG. 6.

The second sensing coil 152 may be provided on the first surface 150a of the substrate 150 in a substantially disc shape. The second sensing coil 152 is fixed on the first surface 150a of the substrate 150 and does not rotate together with the second sub-shaft 140.

The second sensing coil 152 may be disposed in a zigzag manner between circumferences of imaginary circles having different radii. For example, the second sensing coil 152 may be disposed in a zigzag manner between a third circle having a third radius and a fourth circle having a fourth radius greater than the third radius. Further, a shape of the second sensing coil 152 may be the same as a shape of the first sensing coil 151 illustrated in FIG. 8.

A shape of the second sensing coil 152 may be the same as a shape of the first sensing coil 151 illustrated in FIG. 6.

The center of the annular second sensing coil 152 may be substantially the same as the center of rotation of the second sub-rotor 143. In other words, an imaginary second straight line extending from the rotation axis of the second sub-rotor 143 may pass through the center of the annular second sensing coil 152.

The second sub-rotor 143 may be provided in the vicinity of the second sensing coil 152. In other words, the second sub-rotor 143 may rotate about the center of the second sensing coil 152 in the vicinity of the second sensing coil 152.

Thereby, the plurality of second rotor teeth 143a may periodically pass near the second sensing coil 152 by the rotation of the second sub-rotor 143.

In this case, the second sub-rotor 143 and the plurality of second rotor teeth 143a may be made of a magnetic material, and as the plurality of second rotor teeth 143a, which are made of the magnetic material, periodically pass near the second sensing coil 152, the reluctance of the second sensing coil 152 may periodically change and the impedance of the second sensing coil 152 may also periodically change. For example, the impedance or reluctance of the second sensing coil 152 may change in a cycle in which the second rotor teeth 143a rotate once.

Therefore, the rotation of the second sub-rotor 143 may be identified by measuring the periodic change in impedance or reluctance of the second sensing coil 152. The rotation of the first sub-rotor 123 may be identified by measuring the periodic change in impedance or reluctance of the first sensing coil 151.

The rotation of the first sub-rotor 123 may be the same as the rotation of the first sub-gear 121, and the rotation of the second sub-rotor 143 may be the same as the rotation of the second sub-gear 141. The rotation of the initial shaft 110 up to 1480 degrees may be identified by combination of the rotation angle of the first sub-gear 121 and the rotation angle of the second sub-gear 141. Therefore, the rotation of the initial shaft 110 up to 1480 degrees may be identified by the periodic change in impedance or reluctance of the first sensing coil 151 and the periodic change in impedance or reluctance of the second sensing coil 152.

As described above, the position sensor 100 may include the initial shaft 110 that rotates with the linear movement of the rack bar assembly 50, the first sub-shaft 120 that rotates at a first rate with respect to the rotation of the initial shaft 110, the first sub-rotor 123 that rotates together with the first sub-shaft 120, the first sensing coil 151 whose impedance or reluctance changes depending on the rotation of the first sub-rotor 123, the second sub-shaft 140 that rotates at a second rate with respect to the rotation of the initial shaft 110, the second sub-rotor 143 that rotates together with the second sub-shaft 140, and the second sensing coil 152 whose impedance or reluctance changes depending on the rotation of the second sub-rotor 143.

By measuring the change in impedance or reluctance of the first sensing coil 151 and the change in impedance or reluctance of the second sensing coil 152, the rotation angle of the initial shaft 110 may be identified, and further, the linear displacement of the rack bar assembly 50 may be identified.

Hereinafter, a configuration for measuring the change in impedance or reluctance of the first sensing coil 151 and the change in impedance or reluctance of the second sensing coil 152 will be described.

Figure 7:
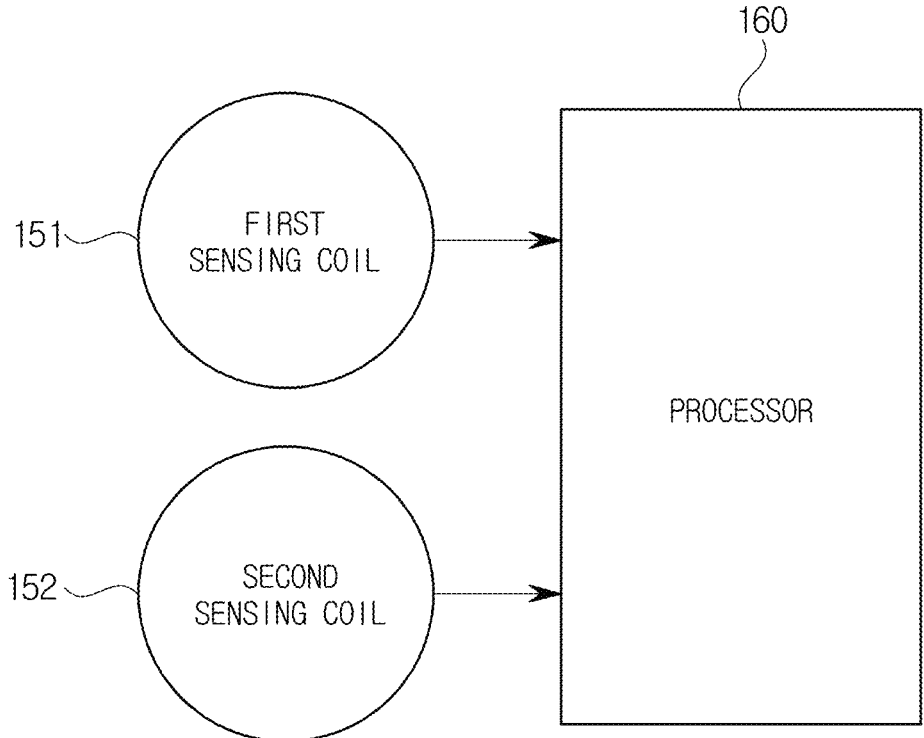
FIG. 7 is a block diagram for illustrating a control configuration of a position sensor in accordance with an embodiment of the present disclosure.
Figure 8A:
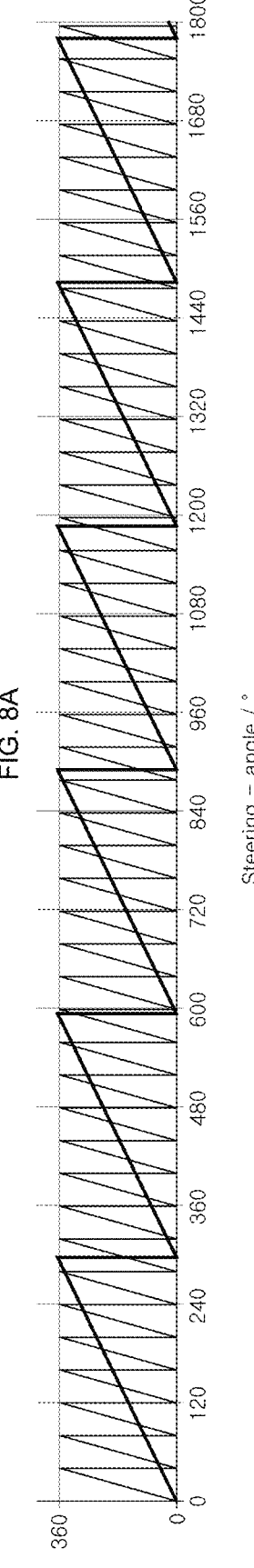
FIGS. 8A and 8B are graphs for illustrating an example of identifying a rotation angle of a shaft by a position sensor in accordance with an embodiment of the present disclosure.
Figure 8B:
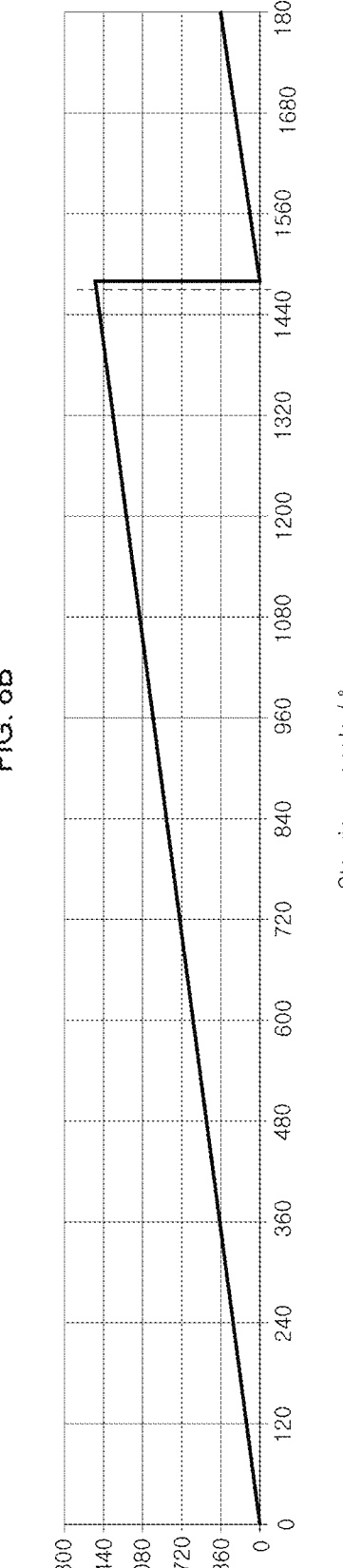

FIG. 7 is a block diagram for illustrating a control configuration of a position sensor in accordance with an embodiment of the present disclosure; and FIG. 8 is graphs for illustrating an example of identifying a rotation angle of a shaft by a position sensor in accordance with an embodiment of the present disclosure.

As illustrated in FIG. 7, the position sensor 100 may include the first sensing coil 151, the second sensing coil 152, and a processor 160.

As illustrated in FIG. 8 described above, the first sensing coil 151 may be disposed in the zigzag manner along the circumferential direction in the annular area between the first circle 151a having the first radius and the second circle 151b having the second radius. In other words, the distance between the center of the first sensing coil 151 and the first sensing coil 151 may periodically change.

The first sub-rotor 123 may be rotatably provided in the vicinity of the first sensing coil 151. The impedance or reluctance of the first sensing coil 151 may periodically change by the rotation of the first sub-rotor 123. For example, while the first sub-rotor 123 rotates, which is made of a magnetic material, a portion of the first rotor teeth 123a of the first sub-rotor 123 corresponding to an inner area of the first sensing coil 151 may periodically change. Thereby, the reluctance of the first sensing coil 151 may periodically change, and a periodic induced current may be induced in the first sensing coil 151.

The second sensing coil 152 may have the same configuration as the first sensing coil 151 described above.

The second sub-rotor 143 may be rotatably provided in the vicinity of the second sensing coil 152. The impedance or reluctance of the second sensing coil 152 may periodically change by the rotation of the second sub-rotor 143.

The processor 160 may identify the impedance or reluctance (or a periodic change thereof) of the first sensing coil 151 and the impedance or reluctance (or a periodic change thereof) of the second sensing coil 152.

For example, the processor 160 may measure a first induced current and a second induced current induced in the first sensing coil 151 and the second sensing coil 152, respectively. The processor 160 may identify the reluctance (or the change thereof) of the first sensing coil 151 and the reluctance (or the change thereof) of the second sensing coil 152 based on the first induced current and the second induced current.

For another example, the processor 160 may periodically apply a voltage signal to each of the first sensing coil 151 and the second sensing coil 152 and measure a current of each of the first sensing coil 151 and the second sensing coil 152. The processor 160 may identify the impedance (or the change thereof) of the first sensing coil 151 and the impedance (or the change thereof) of the second sensing coil 152 based on the respective currents of the first sensing coil 151 and the second sensing coil 152.

The processor 160 may identify the rotation angle of the first sub-rotor 123 based on the identification of the impedance or reluctance (or the periodic change thereof) of the first sensing coil 151. In addition, the processor 160 may identify the rotation angle of the second sub-rotor 143 based on the identification of the impedance or reluctance (or the periodic change thereof) of the second sensing coil 152.

For example, the processor 160 may identify that the first sub-rotor 123 has rotated once based on the change in impedance or reluctance of the first sensing coil 151 per cycle. In addition, the processor 160 may identify that the second sub-rotor 143 has rotated once based on the change in impedance or reluctance of the second sensing coil 152 per cycle.

The processor 160 may identify the rotation angle of the initial shaft 110 based on the rotation angle of the first sub-rotor 123 and the rotation angle of the second sub-rotor 143.

As described above, a rotation ratio between the initial shaft 110 and the first sub-rotor 123 may be set by a predetermined gear ratio between the initial gear 111 and the first sub-gear 121. For example, a rotation ratio between the initial shaft 110 and the first sub-rotor 123 may be approximately 1:1.216. In other words, as illustrated in FIG. 8, while the first sub-rotor 123 rotates 360 degrees (rotation angle on a y-axis), the initial shaft 110 may rotate approximately 296 degrees (rotation angle on an x-axis).

In addition, a rotation ratio between the initial shaft 110 and the second sub-rotor 143 may be set by a predetermined gear ratio between the initial gear 111 and the second sub-gear 141. For example, the rotation ratio between the initial shaft 110 and the second sub-rotor 143 may be approximately 1:9. In otherwords, as illustrated in FIG. 8, while the second sub-rotor 143 rotates 360 degrees (rotation angle on the y-axis), the initial shaft 110 may rotate approximately 40 degrees (rotation angle on the x-axis).

A pair of the rotation angle of the first sub-rotor 123 and the rotation angle of the second sub-rotor 143 may correspond to the rotation angle of the initial shaft 110. For example, as illustrated in FIG. 8, when the rotation angle of the initial shaft 110 is "0" degrees, the rotation angle of the first sub-rotor 123 is "0" degrees and the rotation angle of the second sub-rotor 143 is "0" degrees. Then, when both the rotation angle of the first sub-rotor 123 and the rotation angle of the second sub-rotor 143 become "0" degrees again, the rotation angle of the initial shaft 110 is "1480" degrees.

Therefore, the rotation angle of the initial shaft 110 may be between "0" and "1480" degrees, and the rotation angle of the initial shaft 110 may correspond to a pair of unique rotation angles of the first sub-rotor 123 and the second sub-rotor 143.

In other words, the rotation angle of the initial shaft 110 between "0" and "1480" degrees may be identified by the pair of the rotation angle of the first sub-rotor 123 and the rotation angle of the second sub-rotor 143.

As such, the processor 160 may identify the rotation angle of the initial shaft 110 within a predetermined angular range (e.g., between "0" degrees and "1480" degrees) based on the identification of the impedance or reluctance (or the periodic change thereof) of the first sensing coil 151 and the impedance or reluctance (or the periodic change thereof) of the second sensing coil 152.

In addition, the processor 160 may provide the identified rotation angle of the initial shaft 110 to the steering controller 70 of the steering apparatus 1.

As described above, the steering controller 70 may identify an actually measured position of the rack bar assembly 50 based on the output signal of the position sensor 100. In addition, the steering controller 70 may compare the actually measured position with the target position and control the steering motor 60 so that the actually measured position of the rack bar assembly 50 follows the target position.

In addition, the angle sensor 30 of the steering apparatus 1 may have substantially the same configuration and perform substantially the same function as the position sensor 100. The position sensor 100 may identify the rotation angle of the initial shaft 110 connected to the rack bar assembly 50, while the angle sensor 30 may identify the rotation angle of the steering column 20 connected to the steering wheel 10.

As is apparent from the above description, according to one aspect of the present disclosure, it is possible to provide a position sensor and a steering apparatus capable of detecting the position and movement of a rack bar.

According to one aspect of the present disclosure, it is possible to provide a position sensor and a steering apparatus capable of improving reliability, stability, and robustness of position detection and movement detection.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/ or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A position sensor comprising:
a substrate having a first surface and a second surface opposite to the first surface;
an initial shaft passing through the first and the second surfaces of the substrate in a direction perpendicular to the substrate;
an initial gear mounted to the initial shaft and positioned above the first surface of the substrate;
a first sub-shaft positioned above the first surface of the substrate, and disposed perpendicular to the substrate and parallel to the initial shaft;
a first sub-gear mounted to the first sub-shaft and positioned above the first surface of the substrate and rotatably engaged with the initial gear;
a first sub-rotor mounted to the first sub-shaft and positioned above the first surface of the substrate;
a first sensing coil disposed on the first surface of the substrate;
a second sub-shaft positioned above the first surface of the substrate, and disposed perpendicular to the substrate and parallel to the initial shaft and the first sub-shaft;
a second sub-gear mounted to the second sub-shaft and positioned above the first surface of the substrate and rotatably engaged with the initial gear;
a second sub-rotor mounted to the second sub-shaft and positioned above the first surface of the substrate; and
a second sensing coil disposed on the first surface of the substrate.

2. The position sensor according to claim 1, wherein a first gear ratio between the initial gear and the first sub-gear is different from a second gear ratio between the initial gear and the second sub-gear.

3. The position sensor according to claim 1, wherein a rotational speed of the first sub-gear is different from a rotational speed of the second sub-gear.

4. The position sensor according to claim 1, wherein a diameter of the first sub-gear is different from a diameter of the second sub-gear.

5. The position sensor according to claim 1, wherein a diameter of the initial gear is greater than a diameter of the first sub-gear and a diameter of the second sub-gear.

6. The position sensor according to claim 1, wherein:
the first sub-gear and the first sub-rotor are coaxial with the first sub-shaft, and
the second sub-gear and the second sub-rotor are coaxial with the second sub-shaft.

7. The position sensor according to claim 1, wherein:
the first sub-rotor is coaxial with the first sensing coil, and
the second sub-rotor is coaxial with the second sensing coil.

8. The position sensor according to claim 1, wherein:
a plurality of first rotor teeth are formed on a circumference of the first sub-rotor, and
a plurality of second rotor teeth are formed on a circumference of the second sub-rotor.

9. The position sensor according to claim 8, wherein:
the first sensing coil is in a zigzag pattern, and
the second sensing coil is in a zigzag pattern.

10. The position sensor according to claim 9, wherein:
a radial width of at least one of the plurality of first rotor teeth of the first sub-rotor is equal to a radial width of the zigzag pattern of the first sensing coil, and
a radial width of at least one of the plurality of second rotor teeth of the second sub-rotor is equal to a radial width of the zigzag pattern of the second sensing coil.

11. The position sensor according to claim 8, wherein:
a circumferential width of at least one of the plurality of first rotor teeth of the first sub-rotor is equal to a distance between adjacent two of the plurality of first rotor teeth, and
a circumferential width of at least one of the plurality of second rotor teeth of the second sub-rotor is equal to a distance to adjacent two of the plurality of second rotor teeth.

12. The position sensor according to claim 1, further comprising a processor electrically connected to the first sensing coil and the second sensing coil.

13. The position sensor according to claim 12, wherein the processor is configured to:
identify impedance or reluctance of the first sensing coil;
determine a rotation angle of the first sub-rotor based on the impedance or reluctance of the first sensing coil;
identify impedance or reluctance of the second sensing coil; and
determine a rotation angle of the second sub-rotor based on the impedance or reluctance of the second sensing coil.

14. The position sensor according to claim 13, wherein the processor is configured to determine a rotation angle of the initial shaft based on the rotation angle of the first sub-rotor and the rotation angle of the second sub-rotor.

15. The position sensor according to claim 1, wherein the initial shaft is connected to a rack bar assembly of a vehicle.

16. A steering apparatus comprising:
a rack bar assembly connected to wheels of a vehicle;
a steering motor configured to generate torque for linearly moving the rack bar assembly;
an angle sensor configured to sense a rotation angle of a steering column connected to a steering wheel of the vehicle;
an initial shaft connected to the rack bar assembly;
a position sensor configured to sense a rotation angle of the initial shaft; and
a controller configured to control the steering motor based on the rotation angle of the steering column sensed by the angle sensor and the rotation angle of the initial shaft sensed by the position sensor,
wherein the position sensor includes:
a substrate including a first surface and a second surface opposite to the first surface, wherein an initial shaft passing through the first and the second surfaces of the substrate in a direction perpendicular to the substrate;
an initial gear mounted to the initial shaft and positioned above the first surface of the substrate;
a first sub-shaft positioned above the first surface of the substrate, and disposed perpendicular to the substrate and parallel to the initial shaft;
a first sub-gear mounted to the first sub-shaft and positioned above the first surface of the substrate and rotatably engaged with the initial gear;
a first sub-rotor mounted to the first sub-shaft and positioned above the first surface of the substrate;
a first sensing coil disposed on the first surface of the substrate;

17 a second sub-shaft positioned above the first surface of the substrate, and disposed perpendicular to the substrate and parallel to the initial shaft and the first sub-shaft;
a second sub-gear mounted to the second sub-shaft and positioned above the first surface of the substrate and rotatably engaged with the initial gear;
a second sub-rotor mounted to the second sub-shaft and positioned above the first surface of the substrate; and
a second sensing coil disposed on the first surface of the substrate.

17. The steering apparatus according to claim 16, wherein a first gear ratio between the initial gear and the first sub-gear is different from a second gear ratio between the initial gear and the second sub-gear.

18. The steering apparatus according to claim 16, wherein a diameter of the first sub-gear is different from a diameter of the second sub-gear.

19. The steering apparatus according to claim 16, wherein the position sensor further includes a processor electrically connected to the first sensing coil and the second sensing coil, and

the processor is configured to:

identify impedance or reluctance of the first sensing coil;

determine a rotation angle of the first sub-rotor based on the impedance or reluctance of the first sensing coil;

identify impedance or reluctance of the second sensing coil; and determine a rotation angle of the second sub-rotor based on the impedance or reluctance of the second sensing coil.

20. The steering apparatus according to claim 19, wherein the processor is configured to:

identify the rotation angle of the initial shaft based on the rotation angle of the first sub-rotor and the rotation angle of the second sub-rotor; and provide an output signal associated with the rotation angle of the initial shaft to the controller.

* * * * *